US005495663A

United States Patent [19]
Saito

[11] Patent Number: 5,495,663
[45] Date of Patent: Mar. 5, 1996

[54] APPARATUS FOR REMOVING AN ELECTRODE CHIP FROM A SHANK OF A RESISTANCE WELDING MACHINE

[76] Inventor: Akihiro Saito, 864 Nakashinden, Ebina-shi, Kanagawa-ken, Japan

[21] Appl. No.: 72,176

[22] Filed: Jun. 4, 1993

[51] Int. Cl.⁶ .................................................. B23P 19/04
[52] U.S. Cl. .................................................. 29/762; 29/253
[58] Field of Search .................................. 29/33 B, 235, 29/246, 253, 263, 762, 749–754, 764; 228/55, 56.3, 264; 219/86.8

[56] References Cited

U.S. PATENT DOCUMENTS

| | | | |
|---|---|---|---|
| 1,601,752 | 10/1926 | Worthan | 29/246 |
| 2,486,851 | 11/1949 | Jennings et al. | 29/246 X |
| 2,594,789 | 4/1952 | Morin | 29/246 X |
| 3,538,580 | 11/1970 | Bruner | 29/764 X |
| 3,609,847 | 10/1971 | Engler | 29/246 X |
| 3,698,058 | 10/1972 | Reimer et al. | 29/764 X |
| 4,451,977 | 6/1984 | Matthews et al. | 29/762 X |
| 4,794,221 | 12/1988 | Takabe et al. | 219/86.8 |

FOREIGN PATENT DOCUMENTS

| | | | |
|---|---|---|---|
| 668976 | 8/1963 | Canada | 29/762 |
| 68660 | 5/1980 | Japan | 29/764 |
| 3738 | 6/1988 | Japan | 29/762 |
| 184673 | 8/1991 | Japan | 29/762 |

OTHER PUBLICATIONS

Western Electric Technical Digest, No. 48, Oct. 1977, pp. 27–28.

Primary Examiner—Peter Vo
Attorney, Agent, or Firm—Ratner & Prestia

[57] ABSTRACT

An apparatus for removing an electrode chip of a resistance welding machine from a shank holding the electrode chip thereon comprising a shank holder to hold the shank, an electrode chip holder having a pair of holder halves to hold the electrode chip on the shank therebetween and means to move the electrode chip holder in a direction which is parallel to an axis of the shank so that the electrode chip holder move far away from the shank.

7 Claims, 8 Drawing Sheets

APPARATUS FOR REMOVING AN ELECTRODE CHIP FROM A SHANK OF A RESISTANCE WELDING MACHINE

BACKGROUND OF THE INVENTION

This invention relates to an apparatus for automatically removing an electrode chip from a shank of a resistance welding robot on which the electrode chip is held.

Respective electrode chips on a pair of shanks for a resistance welding robot are required to be periodically replaced by new ones because the electrode chips are worn away due to their repeated use. Thus, the electrode chips should be removed from the corresponding shanks by an electrode chip removing apparatus.

Such electrode chip removing devices have been disclosed by Japanese Patent Application Laying-Open No. 184673/1991 and Japanese Utility Modal Publication No. 3,738/1992, for example.

The device disclosed by Japanese Patent Application Laying-Open No. 184673/1991 is shown in FIGS. 13 and 14. A pair of electrode chips 1 and 1 on respective shanks 2 and 2 for a welding robot gun are moved by the shanks 2 and 2 in a direction in which they move closely to each other to enter recesses 101 and 101 in a remover arm 100. The electrode chips 1 and 1 are held on the remover arm 100 by cams 102 and 102 which are pivotally mounted on the remover arm 100 so that the cams 102 and 102 rotate and bite the electrode chips 1 and 1 as indicated by a dotted line in FIG. 14 so as to securely hold them on the remover arm 100. Thus, when the shanks 2 and 2 are moved in a direction in which they are moved away from each other, the electrode chips 1 and 1 are removed from the shanks 2 and 2 while they are kept to remain in the recesses 101 and 101. The cams 102 and 102 may be rotatably moved by an appropriate driver not shown.

However, according to the chip removing device disclosed by Japanese Patent Application Laying-Open No. 184673/1991, if the electrode chips 1 and 1 are very securely held on the shanks, then it is difficult to remove them from the corresponding shanks 2 and 2. In addition, the cams 102 and 102 tend to deform the end of the shanks 2 and 2 or the robot gun because the cams are forcedly engaged with the electrode chips 1 and 1.

The device disclosed by Japanese Utility Model Publication No. 3738/1992 is shown in FIG. 15. The remover device 200 may be in the form of an arm having a U-shaped end 202 which is disposed between a shoulder 2a of the shank 2 and an upper end 1a of the electrode chip 1 and a pivoting protrusion 202a engaged with the shoulder 2a of the shank 2 so that the remover device 200 can rotate about the pivoting protrusion 202a in a clockwise direction as indicated by an arrow A of FIG. 15. This rotation of the remover device 200 causes the electrode chip 1 to be removed from the shank 2 in a downward direction as viewed in FIG. 15.

However, such a remover device 200 tends to damage the shoulder 2a of the shank 2 as well as the upper end 1a of the electrode chip 1. Furthermore, an axis of the shank 2 will be disadvantageously deformed as indicated by an arrow B of FIG. 15 due to a force applied to the shank 2 as indicated by the arrow B when the electrode chip 1 is removed from the shank 2.

SUMMARY OF THE INVENTION

Accordingly, it is a principal object of the invention to provide an apparatus for removing an electrode chip from a shank easily although the electrode chip is securely mounted on the shank.

It is another object of the invention to provide an apparatus for removing an electrode chip from a shank without either the shank or the electrode chip being damaged.

It is a further object of the invention to provide an apparatus for removing an electrode chip from a shank without the shank being deformed.

In accordance with the present invention, there is provided an apparatus for removing an electrode chip for a resistance welding machine from a shank which holds the electrode chip thereon. The apparatus comprises a shank holder to hold the shank and an electrode chip to hold the electrode chip on the shank so that the electrode chip is gripped. Also included are means to move the electrode chip holder in a direction which is parallel to an axis of the shank and in which the electrode chip holder moves away from the shank while the electrode chip holder holds the electrode chip. While the shank is held by the shank holder and while the electrode chip is held by the electrode chip holder, the latter is moved perpendicular to the axis of the shank so that the electrode chip is removed from the shank. This allows the electrode chip to be automatically and rapidly removed without damaging the shank and the electrode chip.

BRIEF DESCRIPTION OF THE DRAWINGS

The above and other objects and features of the invention will be apparent from the description of the embodiment of the invention taken along with the accompanying drawings in which.

DETAILED DESCRIPTION OF THE INVENTION

Figure 1:
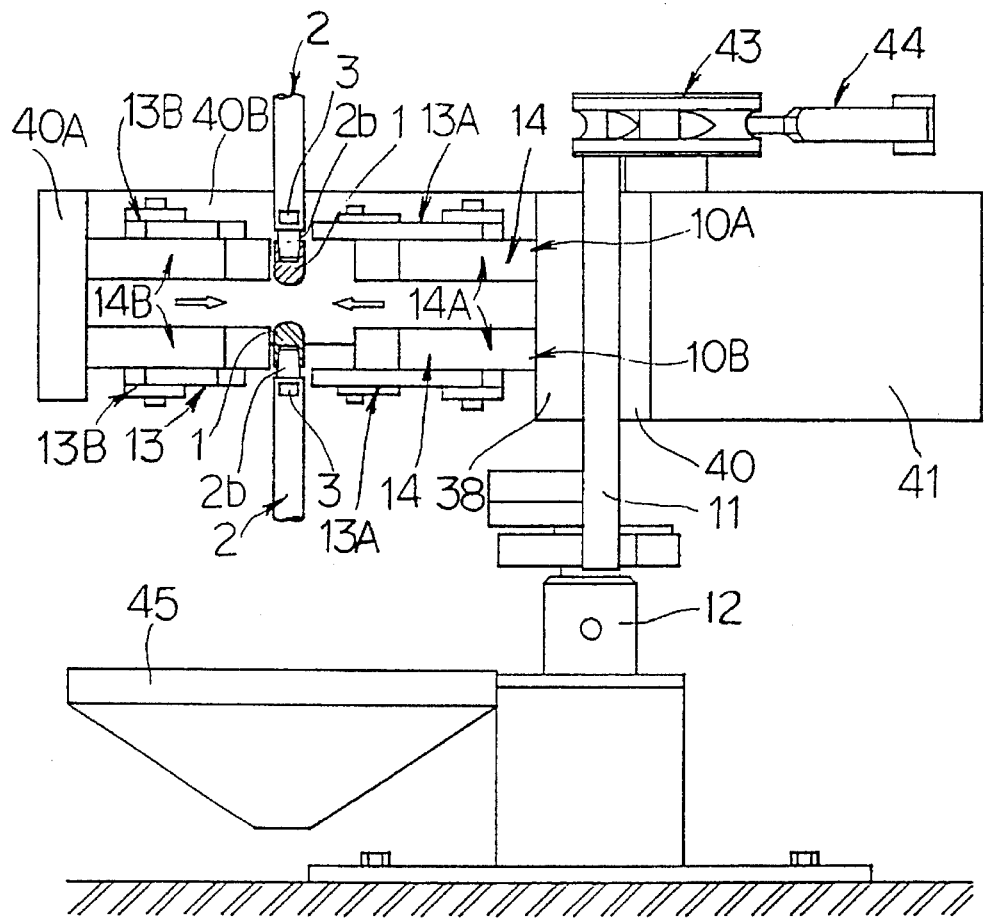
FIG. 1 is a front view of an apparatus for removing an electrode chip from a shank of a resistance welding machine constructed in accordance with the invention.

Referring now to FIGS. 1 through 7, there is shown an apparatus constructed in accordance with the invention for removing a pair of upper and lower electrode chips 1 and 1 from a pair of upper and lower shanks 2 and 2, respectively of a robot type resistance welding machine. The shanks 2 and 2 have tapered ends 2b and 2b of reduced diameter on which the electrode chips 1 and 1 are securely mounted. As more particularly shown in FIG. 4, the shanks 2 and 2 have a pair of flat portions 3 which are formed by cutting away the peripheries of the shanks 2 and 2. The shanks 2 and 2 are held by shank holders which the flat portions 3 of the shanks 2 and 2 engage as described below. It should be noted that at least one flat portion 3 may be formed in the shanks 2.

As shown in FIG. 1, there may be provided upper and lower apparatus sections 10A and 10B for removing the upper and lower electrode chips 1 and 1, respectively. Since the upper and lower sections 10A and 10B are substantially identical to each other, only one of the sections 10A and 10B will be described below. As seen from FIG. 1, the upper and lower sections 10A and 10B are mounted on a base frame 11 which is, in turn, mounted on a stand 12.

The section 10A comprises a shank holder 13 for holding the shank 2 and an electrode chip holder 14 provided below the shank holder 13 for holding the electrode chip 1 by gripping it.

Figure 5:
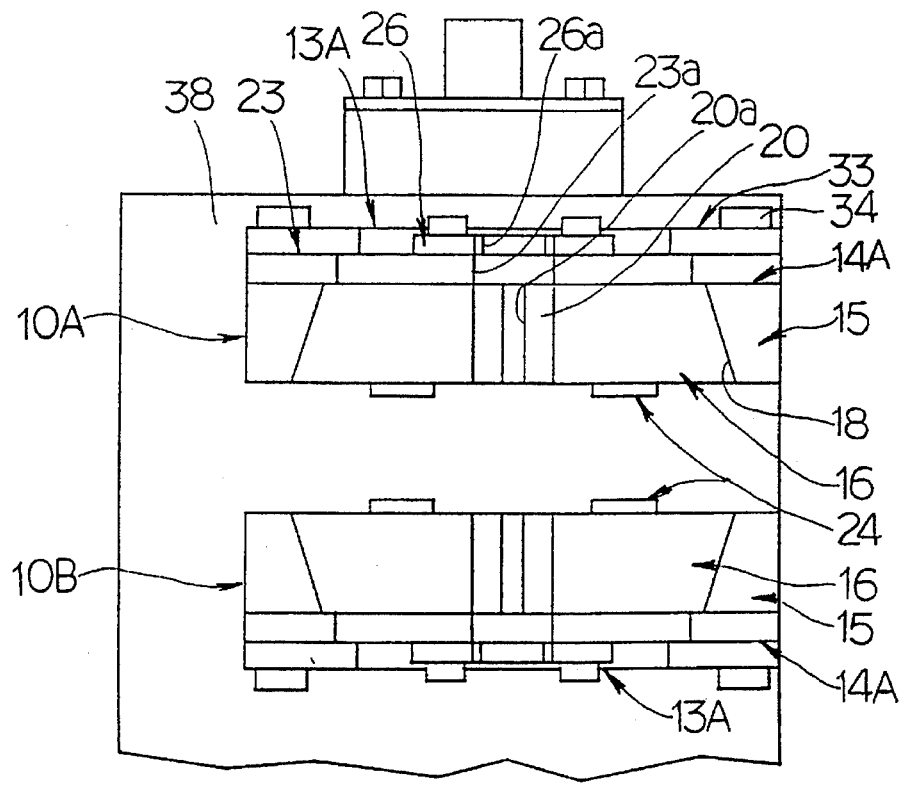
FIG. 5 is a side elevational view of one of a pair of holder halves as viewed from line "A" of FIG. 3.
Figure 4:
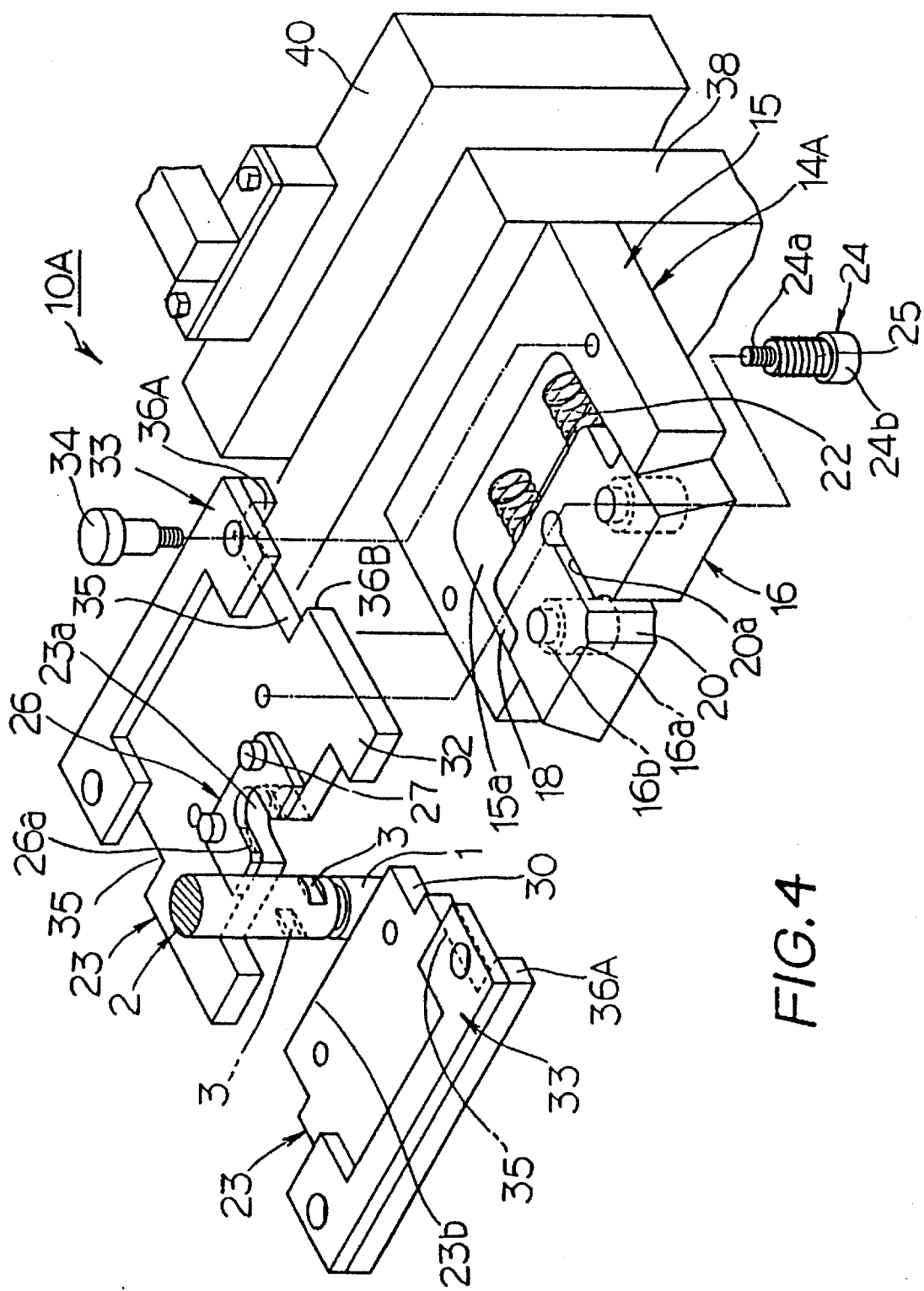
FIG. 4 is an enlarged and exploded perspective view of the apparatus of the invention.
Figure 6:
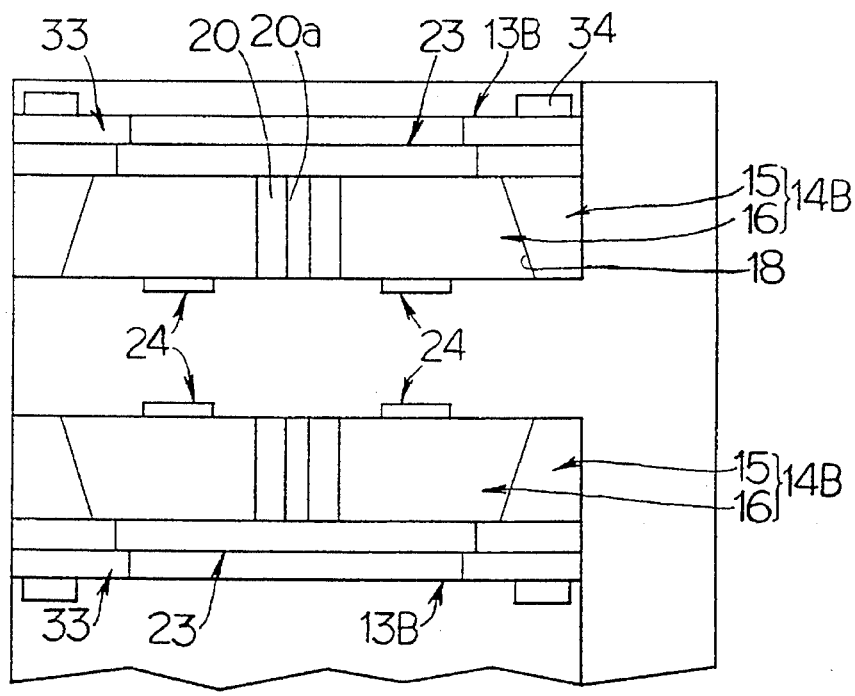
FIG. 6 is an inside elevational view of the other holder half as viewed from line "B" of FIG. 3.
Figure 7:
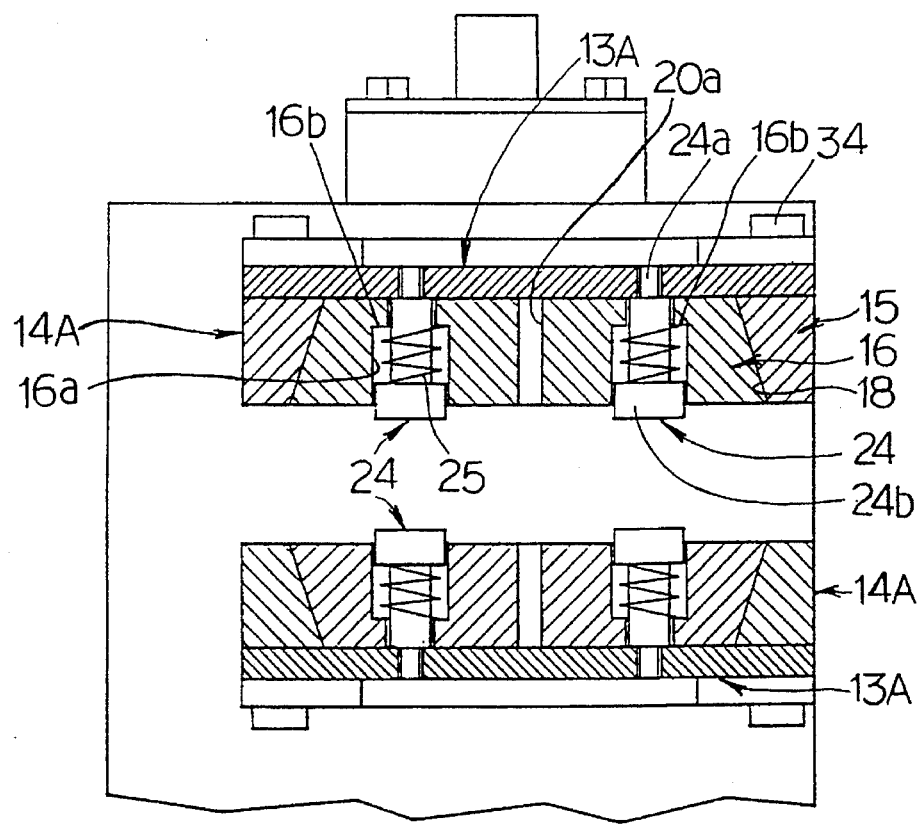
FIG. 7 is a cross sectional view of the holders taken along a line VII—VII OF FIG. 3 and in a non-operating position.
Figure 8:
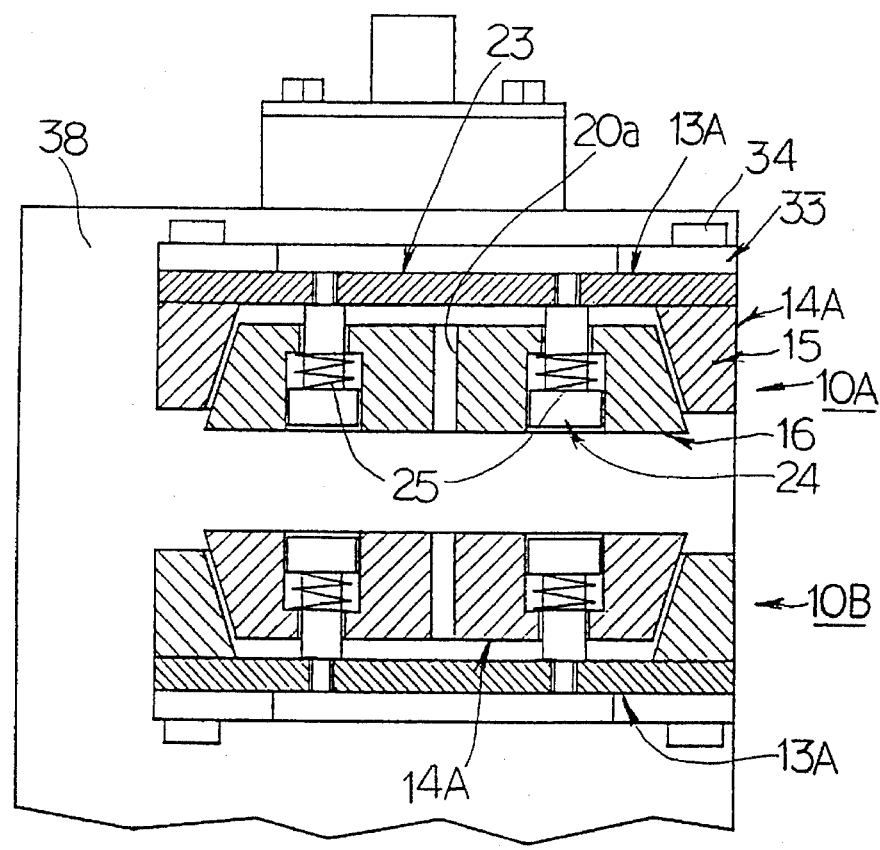
FIG. 8 is a cross sectional side view of the holders, similar to FIG. 7, but in an operating position.
Figure 9:
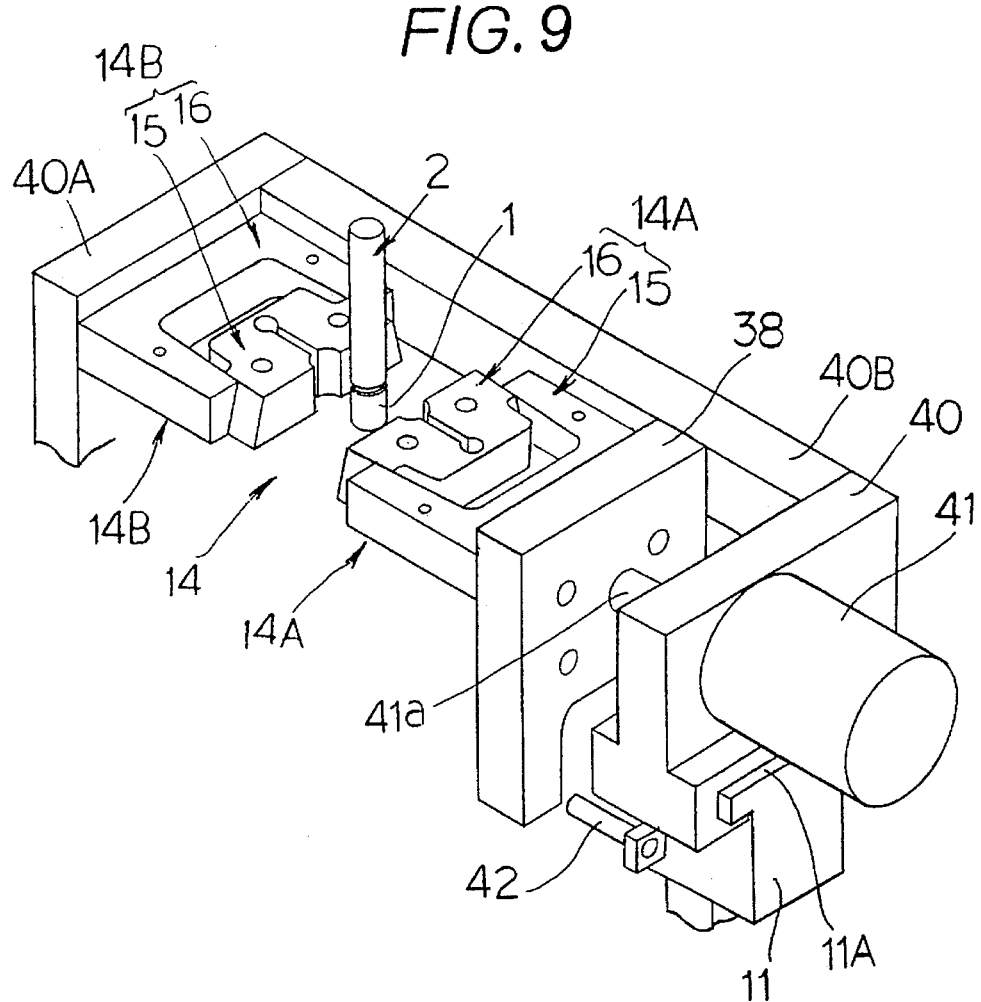
FIG. 9 is a perspective view of the apparatus of the invention illustrating a pair of electrode chip holder halves and means to move the electrode chip holder halves in directions in which they are moved toward each other and away from each other.

As shown in FIGS. 3 through 9, the electrode chip holder 14 comprises a pair of holder halves 14A and 14B each of which includes a U-shaped guide frame 15 and a gripping member 16 which slidably engages an opening 15a in the U-shaped guide frame 15. The guide frame 15 and the gripping member 16 may be of metal such as steel, but they may be of hard plastic or other material. The guide frame 15 has a sliding inner wall 18 tapered so as to be wider in a direction which is parallel to an axis of the shank 2 and toward a position where the electrode chip 1 is removed as shown in FIGS. 5 through 7 and also tapered so as to be narrower in a horizontal direction toward a closed end portion opposite to an opening edge thereof as shown in FIG. 1 and 9. Similarly, the gripping member 16 has a sliding outer wall tapered in a manner similar to the sliding inner wall 18 of the guide frame 15. Thus, it will be noted that both the sliding inner wall face 18 of the guide frame 15 and an outer face of the gripping member 16, which slidably engages the sliding inner wall 18 of the guide frame 15, are of trapezoid shape as seen from a side elevational view and as shown in FIGS. 6, 7 and 9.

The gripping member 16 has a semi-circular gripping face 20 which is closely engaged with the periphery of the electrode chip 1 when the electrode chip holder 14 is to hold the electrode chip 1. The gripping member 16 also has a longitudinal slot 20a extending from the semi-circular gripping face 20 so that the gripping member 16 can resiliently hold the electrode chip 1 with the longitudinal slot 20a narrowed. A compressed coil spring 22 is disposed between the closed wall of the guide frame 15 and the rear wall of the gripping member 16. The coil spring 22 serves to urge the gripping member 16 to move toward the opening edge of the guide frame 15 so as to widen the longitudinal slot 20a of the gripping member 16 whereby the gripping member 16 is extended.

Figure 10:
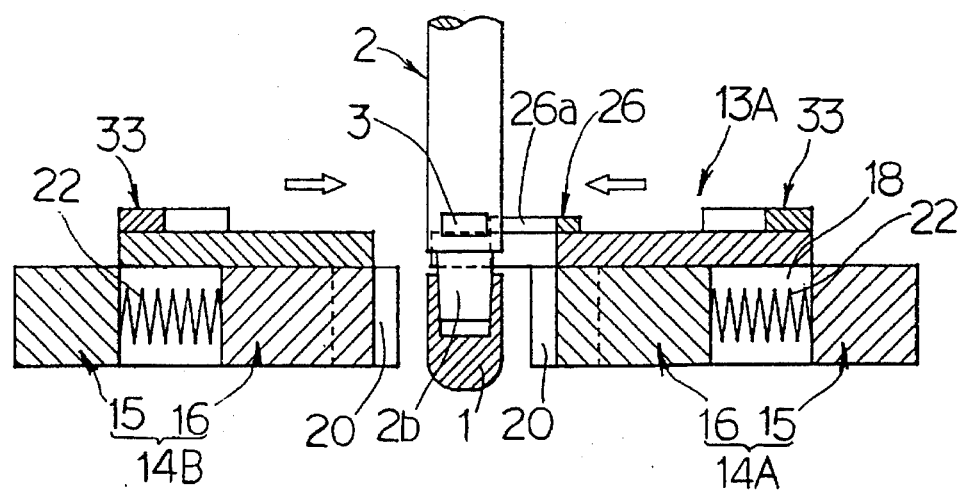
FIG. 10 is a cross sectional front view of the shank holder and the electrode chip holder in a non-operating position.
Figure 11:
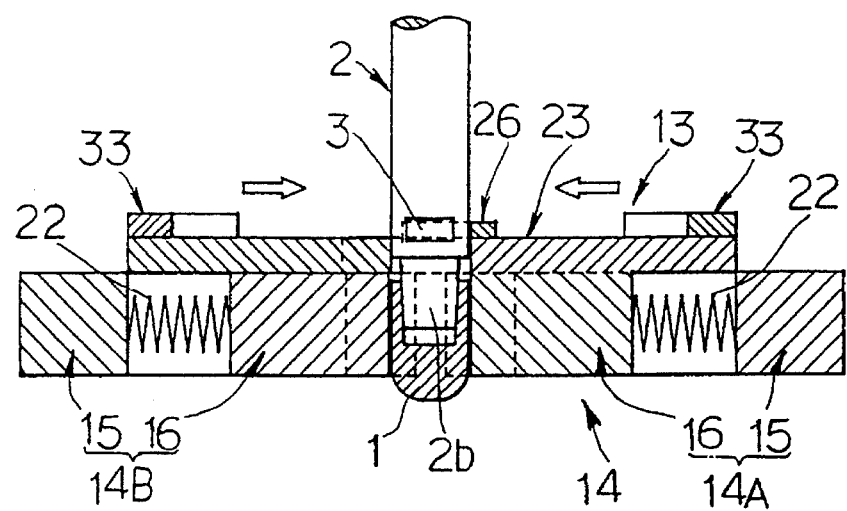
FIG. 11 is similar to FIG. 10 except for the shank holder in a holding position.

The shank holder 13 comprises a pair of holder halves 13A and 13B each of which includes a slidable plate 23 having two stop pins 24 screwed into the slidable plate at its threaded portion 24a. The slidable plate 23 may be preferably of metal such as steel, but it may be also of hard plastic or other material. As seen from FIGS. 4 and 7, the stop pins 24 are positioned in recesses 16a in the gripping member 16 and coil springs 25 are disposed within the recesses 16a between heads 24b of the stop pins 24 and closed ends 16b of the recesses 16a so that the gripping member 16 is resiliently urged to move toward the slidable plate 23, which causes the gripping member 16 to closely engage the sliding inner wall face 18 of the guide frame 15 as shown in FIGS. 7, 10 and 11.

One of the slidable plates 23 of the holder halves 13A and 13B, which is shown to be the slidable plate 23 of the holder half 13A, has a holding plate 26 secured to the slidable plate 23 by bolts 27. A U-shaped recess 23a is provided in the slidable plate 23 at its leading edge and serves to engage the periphery of the shank 2 when the latter is held by the shank holder 13. A U-shaped recess 26a is provided in the holding plate 26 at its leading edge and serves to slidably engage the flat portions 3 of the shank 2 when the latter is held by the shank holder 13. As seen from FIGS. 3 and 5, the wall of the recess 26a in the holding plate 26 protrudes from the wall of the recess 23a in the slidable plate 23.

Figure 12:
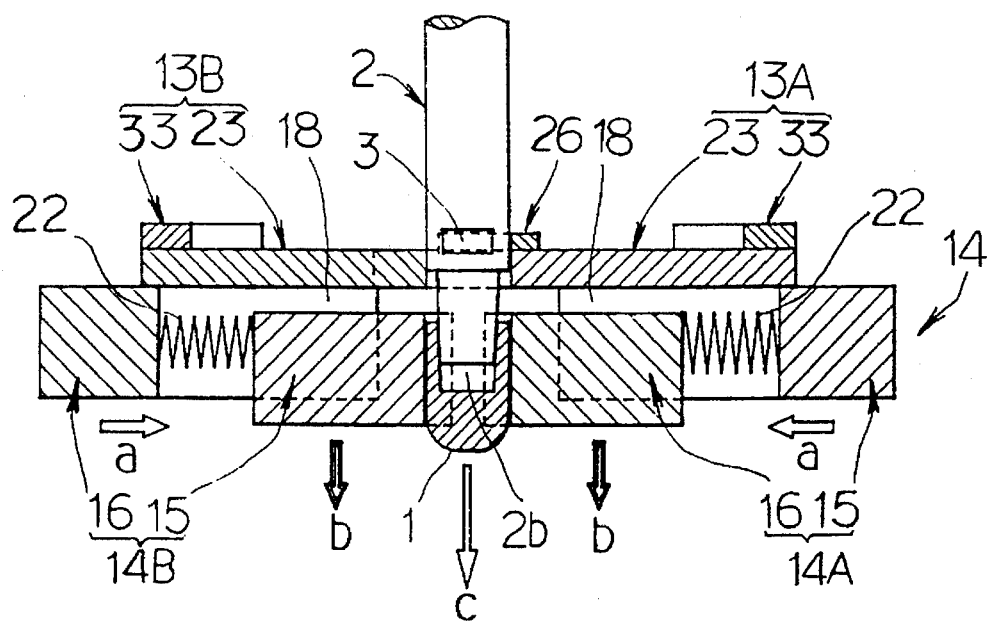
FIG. 12 is similar to FIG. 11, except for the electrode chip holder moved to a removing position.
Figure 13:
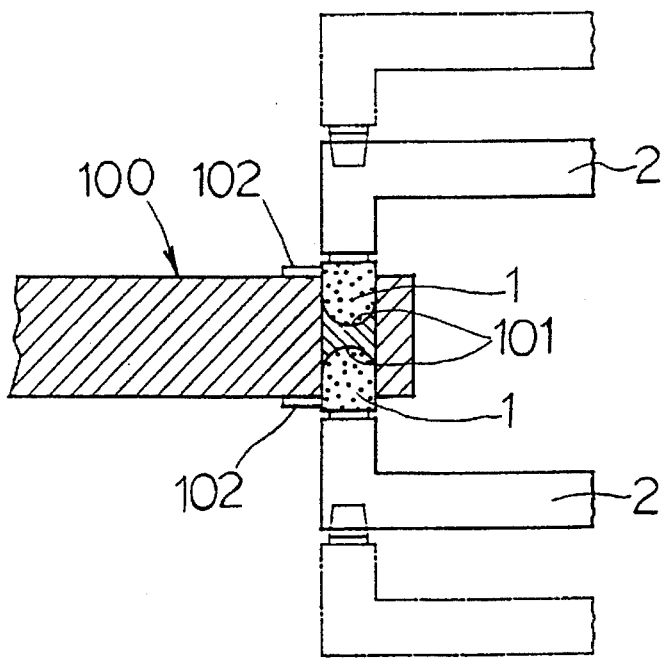
FIG. 13 is a cross sectional view of a device for removing electrode chips constructed in accordance with one item of prior art.
Figure 14:
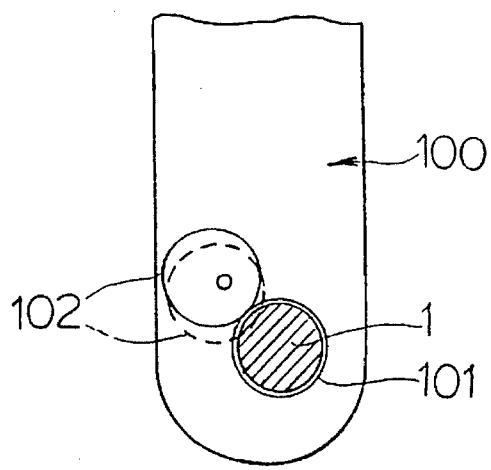
FIG. 14 is a plan view of the device of FIG. 13.
Figure 15:
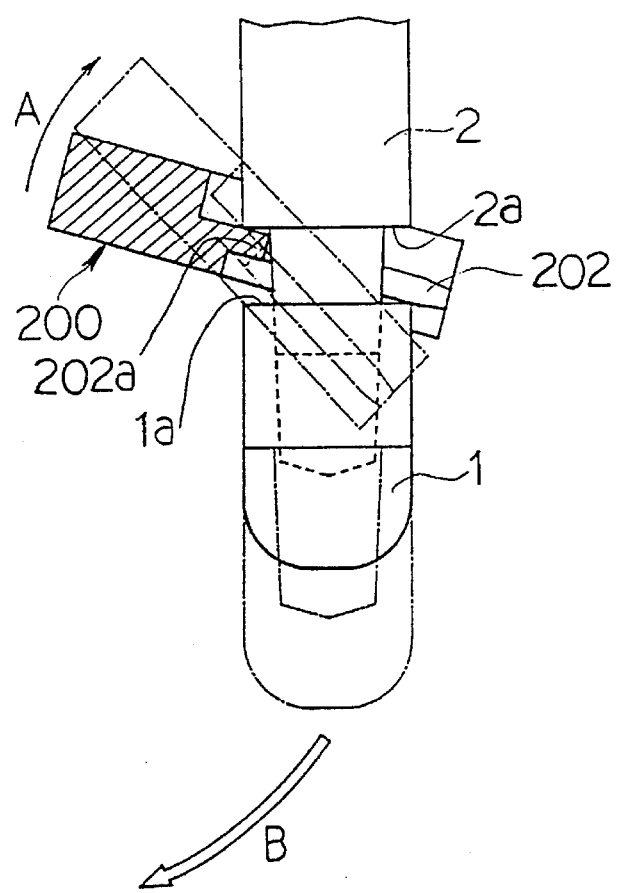
FIG. 15 is a cross sectional view of a device for removing an electrode chip constructed in accordance with another item of prior art.

Another slidable plate 23, corresponding to the holder half 13B, has a flat leading edge 23b which engages the periphery of the shank 2. Thus, it will be noted that the shank 2 can be held between the flat leading edge 23b and the bottom wall of the U-shaped recess 23a while the holding plate 26 meshes with the flat portions 3 of the shank 2 as shown in FIGS. 11 and 12.

Figure 3:
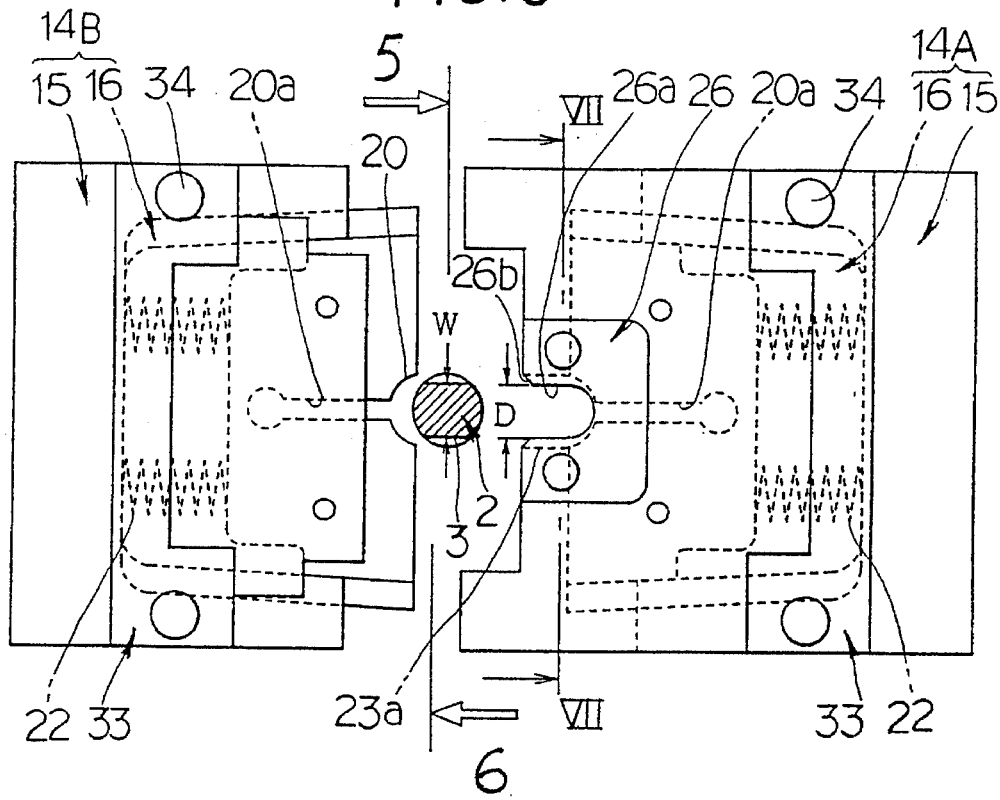
FIG. 3 is an enlarged plan view of a shank holder and an electrode chip holder of the apparatus of the invention.

As shown in FIG. 3, a width W between the two flat portions 3 of the shank 2 is so set to be substantially equal to a distance D between side walls of the U-shaped recess 26a. As seen from FIG. 3, the side walls of the U-shaped recess 26a may preferably have beveling edges 26b provided so that the holding plate 26 smoothly engages the flat portions 3 of the shank 2. As seen from FIG. 4, the slidable plate 23 of the holder half 13B, at its narrowed side faces 30, may preferably engage the slidable plate 23 of the holder half 13A at its guide protrusions 32.

A mounting plate 33, which may be of metal or hard plastic, is mounted on the guide frame 15 by bolts 34 so that the slidable plate 23 is slidably held between the guide frame 15 and the mounting plate 33. As seen from FIG. 4, the bolts 34 extend through side recesses 35 in the slidable plate 23 so that the latter is never obstructed by the bolts 34. The slidable plate 23 of the holder half 13A has stop faces 36A and 36B provided thereon so that forward and rearward movement of the slidable plate 23 of the holder half 13A is controlled by the bolts 34 while the slidable plate 23 of the holder half 13B has a stop face 36A provided thereon so that a forward movement of the slidable plate 23 of the holder half 13B is controlled by the corresponding bolts 34.

Means are provided to move the electrode chip holder 14 in a direction which is parallel to an axis of the shank 2 held by the shank holder 13 so that the electrode chip holder 14 moves away from the shank 2 while the electrode chip holder 14 holds the electrode chip 1. To this end, the shank holder half 13A and the electrode chip holder half 14A are mounted on a first slidable frame 38 which is, in turn, slidably mounted on a second slidable frame 40 as shown in FIGS. 1 and 9. The first slidable frame 38 is in the form of plate while the second slidable frame 40 is of U-shape. The second slidable frame 40 includes a mounting plate 40A provided integrally with the second slidable frame 40 so as to face the first slidable frame 38. The shank holder 13B and the electrode chip holder 14B are mounted on the mounting plate 40A.

Drive means, such as an air cylinder 41, are provided on the second slidable frame 40 and have a piston rod 41a loosely extending through the second slidable frame 40 and connected to the first slidable frame 38. A pin-like stop member 42 is provided on the base frame 11 and serves to be engaged against the first slidable frame 38 when the piston rod 41a of the air cylinder 41 is retracted until the first slidable frame 38 reaches the stop member 42.

Figure 2:
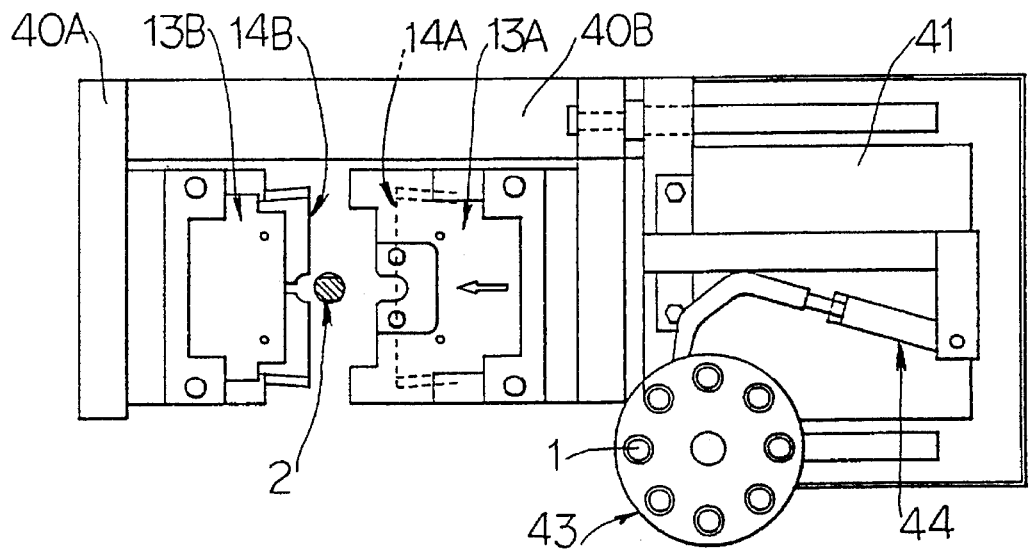
FIG. 2 is a plan view of the apparatus of FIG. 1.

The second slidable frame 40 together with the mounting plate 40A and the air cylinder 41 are slidably mounted on the base frame 11 by guide means not shown. In FIGS. 1, 2 and 9, reference numeral 40B designates a connecting frame portion provided between a portion of the second slidable frame 40 on which the air cylinder 41 is mounted and the mounting plate 40A so as to connect them. Also, in FIG. 9, reference numeral 11A designates a stop face to control the advanced movement of the mounting plate 40A of the second slidable frame 40.

In the illustrated embodiment, there may be provided a chip magazine 43 in which a plurality of new upper and lower electrode chips 1 are contained in a manner in which they are spaced from each other. The chip magazine 43 may be rotatably mounted on the base frame 11. An intermittent motion mechanism 44 may be provided so that the chip magazine 43 rotates by an angular increment at which the electrode chips 1 are positioned. The chip magazine 43 is used for supplying the new electrode chips 1 after the worn electrode chips are removed. Also, there may be provided a waste collecting container 45 mounted on the stand 12 to contain the worn electrode chips 1 removed from the shanks 2.

The operation of the illustrated apparatus will be described with reference to FIGS. 9 through 12. The apparatus, including the upper and lower shank holders 13 and the upper and lower electrode chip holders 14, is located so that the upper and lower electrode chips 1 and 1 are positioned in the middle of the pair of holder halves 13A, 14A and 13B, 14B. When the upper and lower electrode chips 1 and 1 should be replaced by new ones, the air cylinder 41 is operated so that its piston rod 41a is extended.

This causes the first slidable frame 38 together with the right-hand shank holder half 13A and the right-hand electrode chip holder half 14A to be advanced toward the corresponding right-hand shank 2 having the electrode chip 1 mounted thereon as viewed from FIG. 9. As the holder halves 13A and 14A are advanced, the U-shaped recess 26a in the holding plate 26 of the shank holder half 13A slidably engages the flat portions 3 of the shank 2 so that the shank 2 is prevented from moving vertically in the same manner as a spanner engages the shank 2 while the slidable plate 23 at its U-shaped recess 23a engages the periphery of the shank 2 and the electrode chip holder half 14A, at its gripping face 20, engages the electrode chip 1. At that time, the holder halves 13A and 14A stop because of their engagement with the shank 2 and the electrode chip 1. As the piston rod 41a of the air cylinder 41 is further extended, the main slidable frame 40 together with the air cylinder 41 and the left-hand holder halves 13B and 14B slidably move on the base frame 11 in a direction in which the holder halves 13B and 14B move toward the corresponding shank 2 having the electrode chip 1 mounted thereon as viewed from FIG. 9. Thus, the slidable plate 23 of the holder half 13B engages the periphery of the shank 2 so that it holds the shank 2 together with the slidable plate 23 of the holder half 13A and the electrode chip holder half 14A engages the electrode chip 1 so that the electrode chip 1 is disposed between the electrode chip holder halves 14A and 14B.

As the piston rod 41a of the air cylinder 41 is further advanced, the holder halves 13A, 14A and 13A, 14B are moved toward each other as shown in FIG. 11. This causes the guide frames 15 of the electrode chip holder halves 14A and 14B to move toward each other so that the gripping members 16 and 16 of the holder halves 14A and 14B are retracted relative to the corresponding guide frames 15 and 15. Thus, the gripping members 16 and 16 are compressed by the narrowing longitudinal slots 20a due to the sliding inner wall face 18 tapered so as to be narrowed toward the bottoms of the longitudinal slots 20a. This causes the electrode chip 1 to be securely held by the gripping members 16 of the holder halves 14A and 14B in the same manner as it is held by a collet chuck.

With the piston rod 41a of the air cylinder 41 further extended, the guide frames 15 and 15 of the holder halves 14A and 14B together with the mounting plates 33 of the holder halves 13A and 13B are moved forwardly toward each other as indicated by arrows a of FIG. 12 while the coil spring 22 is compressed. This forward movement of the guide frames 15 and 15 is controlled by the stop pins 24 associating with the stop faces 36A and 36B of the slidable plates 23 of the holder halves 13A and 13B.

As a result, the gripping members 16 of the holder halves 14A and 14B are moved against the coil springs 25 in a direction in which the electrode chips 1, gripped by the electrode chip holder 14, are moved far away from the shanks 2 as indicated by arrows b of FIG. 12 due to a vertical force component caused by the tapered sliding inner wall face 18 of the guide frames 15. Thus, the electrode chips 1 are removed from the tapered ends 2b of the corresponding shanks 2 as indicated by an arrow c of FIG. 12 by the movement of the gripping members 16. It should be noted that the electrode chips 1 are removed in a direction parallel to the axes of the shanks 2 and that the shanks 2 are held by the spanner-like engagement with the shank holder half 13A. Thus, the electrode chips 1 and the shanks 2 have no excessive force applied thereto and therefore they are never damaged.

After the worn electrode chips 1 are removed from the corresponding shanks 2, the air cylinder 41 is operated so as to contract the piston rod 41a thereof. The contraction of the piston rod 41a of the air cylinder 41 causes the first slidable frame 38 together with the holder halves 13A and 14A to be moved to the right as viewed from FIG. 9 in which the holder halves 13A and 14A move away from the shank 2 until it bears against the stop member 42. At that time, the first slidable frame 38 stops. As the piston rod 41a of the air cylinder 41 is further contracted, the second slidable frame 40 together with the holder halves 13B and 14B is moved to the left as viewed from FIG. 9 in which the holder halves 13B and 14B move away from the shank 2. As the holder halves 13A, 14A and 13B, 14B move away from the shank 2, the gripping members 16 are advanced relative to the guide frames 15 by the coil springs 22. Thus, the gripping members 16 release the electrode chips 1 from their gripping faces 20 by the longitudinal slots 20a extended due to the horizontal taper of the sliding inner wall face 18 of the guide frames 15 and simultaneously the gripping members 16 are moved close to the slidable plates 23 of the holder halves 13A and 13B by the compressed coil springs 26 due to the vertical taper of the sliding inner face 18 of the guide frames 15 as shown in FIGS. 7 and 10. The electrode chips 1, which are released by the electrode chip holder 14, are dropped in the collecting container 45 on the stand 12 as shown in FIG. 1.

Thereafter, the new electrode chips 1 from the chip magazine 43 are mounted on the corresponding shanks 2 by an apparatus not shown.

It will be noted that a vertical taper angle of the sliding inner wall face 18 of the guide frame 15 determines a ratio of force components by which the electrode chip 1 is held and by which it is removed while a horizontal taper angle thereof determines a magnified force due to its wedge action. Thus, these taper angles should be so set as to have predetermined conditions of various electrode chips.

Although, in the illustrated embodiment of the invention, the shanks 2 having the electrode chips 1 mounted thereon are so disposed as to have vertical axes, they may be so disposed as to have inclined axes in order to be accommodated to a welding position. In this case, after one of the upper and lower electrode chips 1 is removed from the corresponding shanks 2, another electrode chip 1 may be removed.

Although a single embodiment of the invention has been described and illustrated with reference to the accompanying drawings, it will be understood by those skilled in the art that it is by way of example, and that various changes and modifications may be made without departing from the spirit and scope of the invention, which is defined only to the appended claims.

What is claimed:

1. Apparatus for removing an electrode chip from a shank of a resistance welding machine, said shank holding the electrode chip on one end of the shank, said apparatus comprising:

first and second shank holders movable transverse to an axis of the shank for engaging the shank from opposite directions;

first and second electrode chip holders movable in said opposite directions for gripping the electrode chip from said opposite directions;

and means for moving said electrode chip holders in a direction parallel to said axis of the shank and away from the one end of the shank while said shank holders engage the shank and said electrode chip holders maintain a grip of the electrode chip, thereby removing the electrode chip from the shank.

2. Apparatus for removing an electrode chip from a shank of a resistance welding machine as set forth in claim 1, wherein said first shank holder and said first electrode chip holder form a first holder half and said second shank holder and said second electrode chip holder form a second holder half.

3. Apparatus for removing an electrode chip from a shank of a resistance welding machine as set forth in claim 2, wherein said electrode chip holder of each of said holder halves includes:

(a) a U-shaped guide frame, and (b) an associated gripping member slidably engaging said guide frame, and said means for moving said electrode chip holders in a direction parallel to an axis of the shank includes:

(a) tapered sliding faces of said guide frame and said associated gripping member which are wider in a direction which is parallel to said axis of the shank and toward a position where the electrode chip is removed and also narrower in a horizontal direction toward a closed end portion of said guide frame opposite to an opening edge thereof, and (b) drive means for operating said guide frame of each holder half and said associated gripping member of each holder half to retract each said associated gripping member into its associated guide frame.

4. Apparatus for removing an electrode chip from a shank of a resistance welding machine as set forth in claim 3, wherein each said gripping member has a variable width longitudinal slot extending from a gripping face of said gripping member, said slot reducing in width as said gripping member is retracted into its associated guide frame.

5. Apparatus for removing an electrode chip from a shank of a resistance welding machine as set forth in claim 3, wherein said electrode chip holder of each of said holder halves has means for urging said gripping member to be advanced relative to said associated guide frame to dispose said gripping member at a non-operating position, but allow said gripping member to move toward its retracted position.

6. Apparatus for removing an electrode chip from a shank of a resistance welding machine as set forth in claim 5, wherein said electrode chip holder of each of said holder halves has means for urging said gripping member to move relative to its associated guide frame in a direction in which said gripping member moves toward the narrowed sliding face of said guide frame so as to closely engage said sliding face of said gripping member with said sliding face of said guide frame.

7. Apparatus for removing an electrode chip from a shank of a resistance welding machine as set forth in claim 1, wherein said shank holder includes a holding plate for slidingly engaging a flat portion of the shank by spanning said flat portion of the shank.

* * * * *